(12) United States Patent
Hou et al.

(10) Patent No.: US 11,313,538 B2
(45) Date of Patent: Apr. 26, 2022

(54) LIGHTING APPARATUS

(71) Applicant: XIAMEN LEEDARSON LIGHTING CO., LTD, Fujian (CN)

(72) Inventors: Shouqiang Hou, Fujian (CN); Wenjin Peng, Fujian (CN); Xiaoliang Wen, Fujian (CN)

(73) Assignee: XIAMEN LEEDARSON LIGHTING CO., LTD, Fujian (CN)

( * ) Notice: Subject to any disclaimer, the term of this patent is extended or adjusted under 35 U.S.C. 154(b) by 0 days.

(21) Appl. No.: 17/098,141

(22) Filed: Nov. 13, 2020

(65) Prior Publication Data

US 2021/0148548 A1 May 20, 2021

(30) Foreign Application Priority Data

Nov. 15, 2019 (CN) .......................... 201921974974.4

(51) Int. Cl.
| | |
|---|---|
| *F21V 17/10* | (2006.01) |
| *F21V 17/00* | (2006.01) |
| *F21V 3/00* | (2015.01) |
| *F21S 9/02* | (2006.01) |
| *F21V 23/04* | (2006.01) |
| *F21V 23/00* | (2015.01) |
| *F21V 7/04* | (2006.01) |
| *F21V 23/06* | (2006.01) |
| *F21Y 115/10* | (2016.01) |

(52) U.S. Cl.
CPC ............. *F21V 17/002* (2013.01); *F21S 9/02* (2013.01); *F21V 3/00* (2013.01); *F21V 7/048* (2013.01); *F21V 17/10* (2013.01); *F21V 23/003* (2013.01); *F21V 23/04* (2013.01); *F21V 23/06* (2013.01); *F21Y 2115/10* (2016.08)

(58) Field of Classification Search
CPC ........ F21V 17/002; F21V 17/02; F21V 7/048; F21V 7/10; F21V 23/03; F21V 23/04; F21S 9/02; F21Y 2115/10
See application file for complete search history.

(56) References Cited

U.S. PATENT DOCUMENTS

| 6,773,135 B1 * | 8/2004 | Packer | F21S 2/00 |
| | | | 362/145 |
| 9,512,969 B1 * | 12/2016 | Watson | F21K 9/68 |
| 10,267,491 B1 * | 4/2019 | Gordin | F21S 8/086 |
| 2014/0055994 A1 * | 2/2014 | Kang | F21V 7/048 |
| | | | 362/235 |

* cited by examiner

*Primary Examiner* — Anabel Ton
(74) *Attorney, Agent, or Firm* — Chun-Ming Shih; Lanway IPR Services

(57) ABSTRACT

A lighting apparatus includes a top cover, a light source and a bottom cover. The top cover has a top surface, a slope surface and an inner wall. The slope surface and an inner wall form a cavity below the top surface. The inner wall has a light opening. The light source emits a light with a first direction via the light opening of the top cover. The light is guided by the slope surface to move with a second direction to escape from the top surface of the top cover. The light source includes a LED module and a driver for generating a driving current supplied to the LED module to emit the light. The bottom cover is plugged to fix to the top cover.

18 Claims, 13 Drawing Sheets

LIGHTING APPARATUS

FIELD

The present invention is related to a lighting apparatus, and more particularly related to a lighting apparatus conveniently used in night time.

BACKGROUND

The time when the darkness is being lighten up by the light, human have noticed the need of lighting up this planet. Light has become one of the necessities we live with through the day and the night. During the darkness after sunset, there is no natural light, and human have been finding ways to light up the darkness with artificial light. From a torch, candles to the light we have nowadays, the use of light have been changed through decades and the development of lighting continues on.

Early human found the control of fire which is a turning point of the human history. Fire provides light to bright up the darkness that have allowed human activities to continue into the darker and colder hour of the hour after sunset. Fire gives human beings the first form of light and heat to cook food, make tools, have heat to live through cold winter and lighting to see in the dark.

Lighting is now not to be limited just for providing the light we need, but it is also for setting up the mood and atmosphere being created for an area. Proper lighting for an area needs a good combination of daylight conditions and artificial lights. There are many ways to improve lighting in a better cost and energy saving. LED lighting, a solid-state lamp that uses light-emitting diodes as the source of light, is a solution when it comes to energy-efficient lighting. LED lighting provides lower cost, energy saving and longer life span.

The major use of the light emitting diodes is for illumination. The light emitting diodes is recently used in light bulb, light strip or light tube for a longer lifetime and a lower energy consumption of the light. The light emitting diodes shows a new type of illumination which brings more convenience to our lives. Nowadays, light emitting diode light may be often seen in the market with various forms and affordable prices.

After the invention of LEDs, the neon indicator and incandescent lamps are gradually replaced. However, the cost of initial commercial LEDs was extremely high, making them rare to be applied for practical use. Also, LEDs only illuminated red light at early stage. The brightness of the light only could be used as indicator for it was too dark to illuminate an area. Unlike modern LEDs which are bound in transparent plastic cases, LEDs in early stage were packed in metal cases.

In 1878, Thomas Edison tried to make a usable light bulb after experimenting different materials. In November 1879, Edison filed a patent for an electric lamp with a carbon filament and keep testing to find the perfect filament for his light bulb. The highest melting point of any chemical element, tungsten, was known by Edison to be an excellent material for light bulb filaments, but the machinery needed to produce super-fine tungsten wire was not available in the late 19th century. Tungsten is still the primary material used in incandescent bulb filaments today.

Early candles were made in China in about 200 BC from whale fat and rice paper wick. They were made from other materials through time, like tallow, spermaceti, colza oil and beeswax until the discovery of paraffin wax which made production of candles cheap and affordable to everyone. Wick was also improved over time that made from paper, cotton, hemp and flax with different times and ways of burning. Although not a major light source now, candles are still here as decorative items and a light source in emergency situations. They are used for celebrations such as birthdays, religious rituals, for making atmosphere and as a decor.

Illumination has been improved throughout the times. Even now, the lighting device we used today are still being improved. From the illumination of the sun to the time when human can control fire for providing illumination which changed human history, we have been improving the lighting source for a better efficiency and sense. From the invention of candle, gas lamp, electric carbon arc lamp, kerosene lamp, light bulb, fluorescent lamp to LED lamp, the improvement of illumination shows the necessity of light in human lives.

There are various types of lighting apparatuses. When cost and light efficiency of LED have shown great effect compared with traditional lighting devices, people look for even better light output. It is important to recognize factors that can bring more satisfaction and light quality and flexibility.

In the night time, people still need certain illumination. However, the light may also affect people to sleep well.

Sometimes, people will get up in darkness, and a smart lighting is very helpful on such situation.

It is beneficial to design a flexible and convenient solution for such purposes.

SUMMARY

In some embodiments, a lighting apparatus includes a top cover, a light source and a bottom cover.

The top cover has a top surface, a slope surface and an inner wall.

The slope surface and an inner wall form a cavity below the top surface. Specifically, the top surface is a surface defined by a portion of the top cover. The cavity of the slope surface and the inner wall is a concave structure extended inwardly from an inner area of the top surface. Several drawings in this disclosure show examples of such arrangement.

The inner wall has a light opening. There may be three sides of the inner wall, while the light opening is disposed at one side. In some embodiments, two sides of the inner wall have triangular shapes while the side with the light opening has a rectangular shape.

The light source emits a light with a first direction via the light opening of the top cover. Specifically, the light emitted by the light source follow the first direction, which may refer to a set of light paths of the light emitted from the light source. A portion or all the light of the light source is reflected, refracted or guided by the slope surface. Some may be emitted to the inner wall mentioned above and reflected by the inner wall. Therefore, it is useful for attaching a reflective layer on the inner wall to further increase light efficiency.

The light is guided by the slope surface to move with a second direction to escape from the top surface of the top cover. Similar to the first direction, the second direction may refer to a set of light paths, instead of referring to a single direction.

The light source includes a LED module and a driver for generating a driving current supplied to the LED module to emit the light. The LED module may include one or multiple LED chips that may even have different optical parameters to be controlled by the driver to produce mixed lights of different parameters as required.

The driver may include only electricity electrodes, wires or further include control circuits for changing output of the LED module. In some embodiments, the driver may include rectifier, current sources and other circuits as an interface to control and to provide power to the LED module.

The bottom cover is plugged to fix to the top cover. For example, the top cover and the bottom cover both have lateral walls and their lateral walls have buckle structures to be plugged to be fixed together forming a rectangular box.

In some embodiments, the top cover and the bottom cover may not have lateral walls, and a middle structure is used for connecting the top cover and the bottom cover, which is another type of way to fix the top cover to the bottom cover.

In some embodiments, the top cover and the bottom cover are fixed together with a buckle structure. Specifically, one of the top cover and the bottom cover may have a protruding blocks with or without a reverse hook while the other has a groove or a hole to form a pair of buckle units as the buckle structure mentioned here.

In some embodiments, the light source has a diffusion lens for diffusing the light of the LED module before being emitting to the slope surface. Such diffusion lens may have an inner top reflective surface for reflecting the light of the LED module to enter a refraction lateral side and then the light is further reflected by a lateral reflection surface to an output surface of the diffusion lens to diffusing the light of the LED module.

In some embodiments, the bottom cover has a battery container for loading a battery. More than one battery may be installed and corresponding structures and shapes may be prepared according to the shapes of the battery used.

The driving current is supplied by the battery. The power of the battery may be forwarded directly to the LED module by wires of the driver or further processed by the driver.

In some embodiments, a bottom surface of the bottom cover has a battery opening for inserting the battery. Specifically, the battery is inserted from a side opposite to the top surface of the top cover.

In some embodiments, the inner wall has an installation side disposed with the light opening. As mentioned above, the inner wall may have three sides, and the side with the light opening is the installation side.

The light opening faces to the slope surface of the top cover for reflecting light. There may be a tilt angle between the light opening and the slope surface, e.g. an angle between 20 degrees to 80 degrees to ensure lights being smoothly and evenly reflected from the slope surface.

In some embodiments, the LED module is disposed behind the light opening of the inner wall. The light of the LED module is passing through the light opening to reach the slope surface.

In some embodiments, the LED module is disposed on a first circuit board mounted on a second circuit board. The first circuit board is plugged or fixed to the second circuit board with a vertical angle so as to align the output direction of the LED module with the light opening of the top cover.

The second circuit board is disposed on a platform of bottom cover for aligning the LED module to the light opening of the top cover. The platform may have an aligning and plugging structure to install the second circuit board on the platform. When the bottom cover is fixed to the top cover, the LED module is aligned with the light opening.

In some embodiments, a reflective layer is disposed on the slope surface. For example, an additional plate is placed on the slope surface.

In some embodiments, the reflective layer is detachable attached to the slope surface to be manually replaced with another reflective layer. In other words, different colors or materials of the reflective layer may be replaced by a user when needed.

In some embodiments, the reflective layer has multiple wave structures.

In some embodiments, a light guide plate is placed on the slope surface. The light guide plate is a transparent plastic plate with a main surface disposed with lots of micro dots for lights to escape from the micro dots that may be made by laser devices. The light is received from a lateral side of the light guide plate and then guided to move inside the plate before finally escaping from the micro dots of the main surface.

The LED module emits the light into a lateral side of the lateral guide plate for the light to escape from a main surface of the light guide plate.

In some embodiments, the LED module is connected to a rotatable structure so as to adjust the first direction of the LED module to the slope surface. In other words, the LED module is rotated with respect to the slope surface to change a light effect on the slope surface.

In some embodiments, the bottom cover has an electrical plug to be plugged to an external electrical socket to receive a power supply to the driver. For example, the electrical socket is a standard electrical socket mounted on a wall. Users plug the lighting apparatus with the electrical plug with two or three pins to the electrical socket to receive an indoor power of 110V/220V alternating power source. The input power is converted by the driver mentioned above to generate a driving current supplied to the LED module.

In some embodiments, the lighting apparatus may also include a manual switch disposed on a surface of the top cover. Such manual switch may indicate a color temperature, a color or other parameters to the driver to control multiple types of LED chips of the LED modules to emit mixed lights of required parameters.

The manual switch is operated to instruct the driver to change a setting to the LED module.

In some embodiments, the lighting apparatus may also include a sensor coupled to the driver for detecting an external event to change a setting of the driver to control the LED module.

In some embodiments, the sensor includes a light sensor to detect an ambient light level for the driver to automatically determine whether to turn on or turn off the LED module according to the ambient light level.

In some embodiments, the sensor includes a motion sensor to detect a movement of an object for the driver to determine whether to turn on or turn off the LED module.

In some embodiments, the slope surface is attached with a touch input device coupled to the driver to control the LED module. Such touch input device may be a resistor touch interface, a capacitor touch interface, a touch and pressing button or other input structures for receiving an operation of a user.

In some embodiments, the slope surface is attached with touch input device coupled to the driver to wirelessly control another light device. For example, the driver includes a wireless circuit to control one or multiple devices like light devices. In other words, by pressing or applying a gesture on the slope surface, another lighting device may be controlled conveniently.

In some embodiments, multiple function modules are detachably stacked to the top cover to add functions of the multiple function modules. For example, a speaker, a wireless communication module, a wireless charging module, a microphone, a sensor or other function modules may be plugged or inserted to enhance the overall function of the lighting apparatus. Such function modules may share the power of the driver or the battery. Some function modules may even be used for providing power, e.g. a battery module.

DETAILED DESCRIPTION

Figure 13:
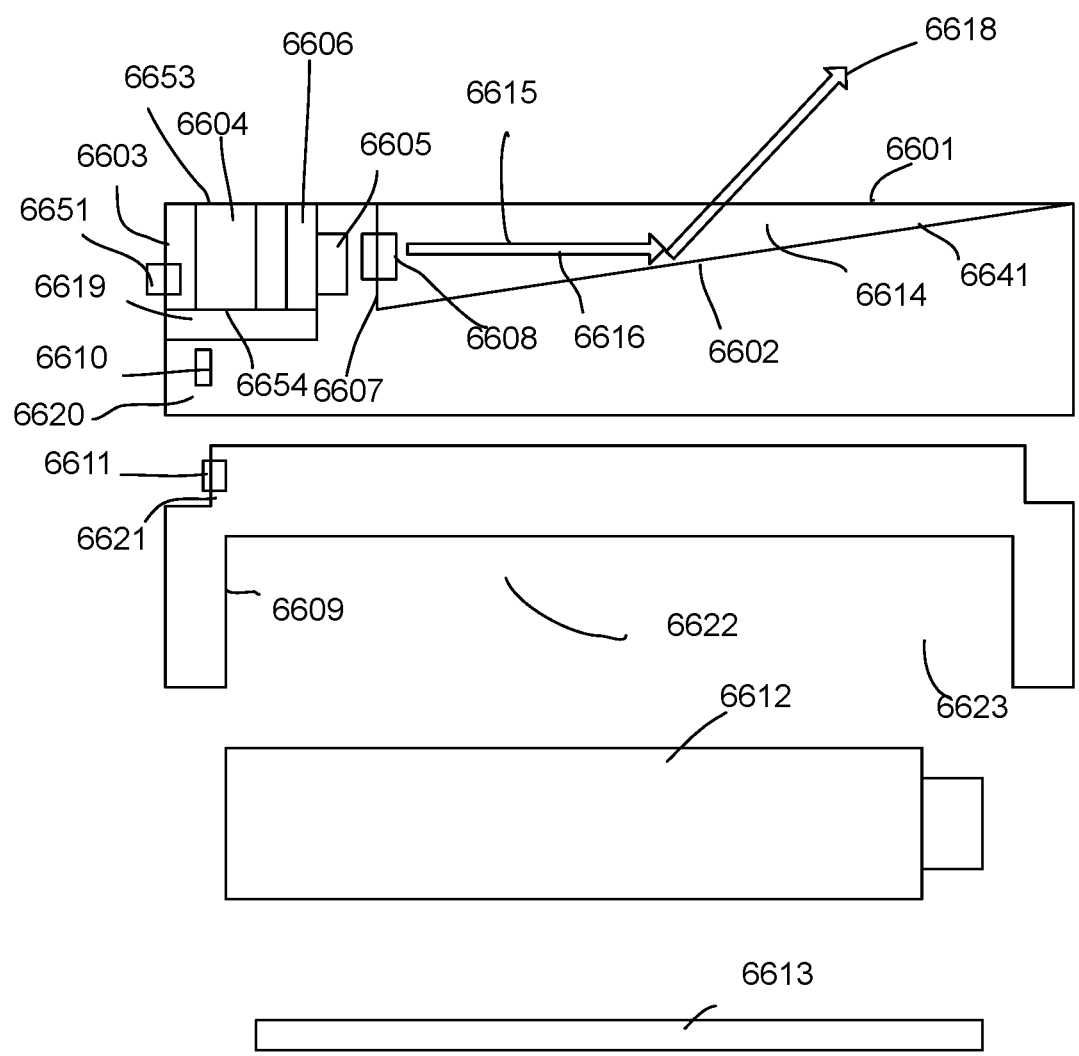
FIG. 13 shows another embodiment.

In FIG. 13, a lighting apparatus includes a top cover 6603, a light source 6606 and a bottom cover 6609.

The top cover 6603 has a top surface 6601, a slope surface 6602 and an inner wall 6607.

Figure 1:
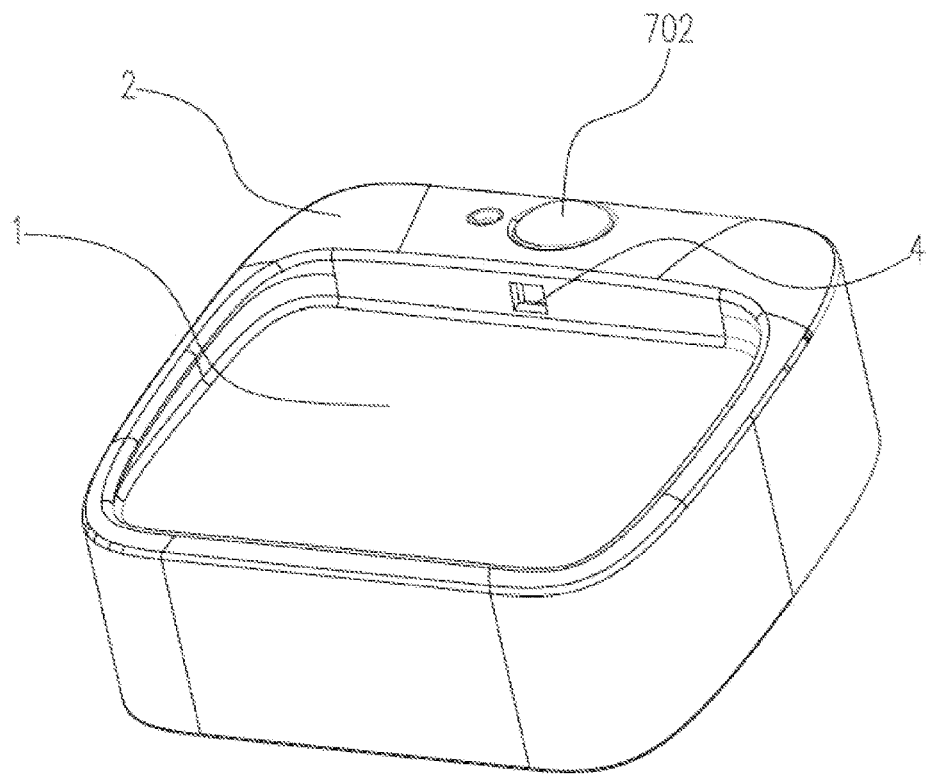
FIG. 1 shows a lighting apparatus example.
Figure 2:
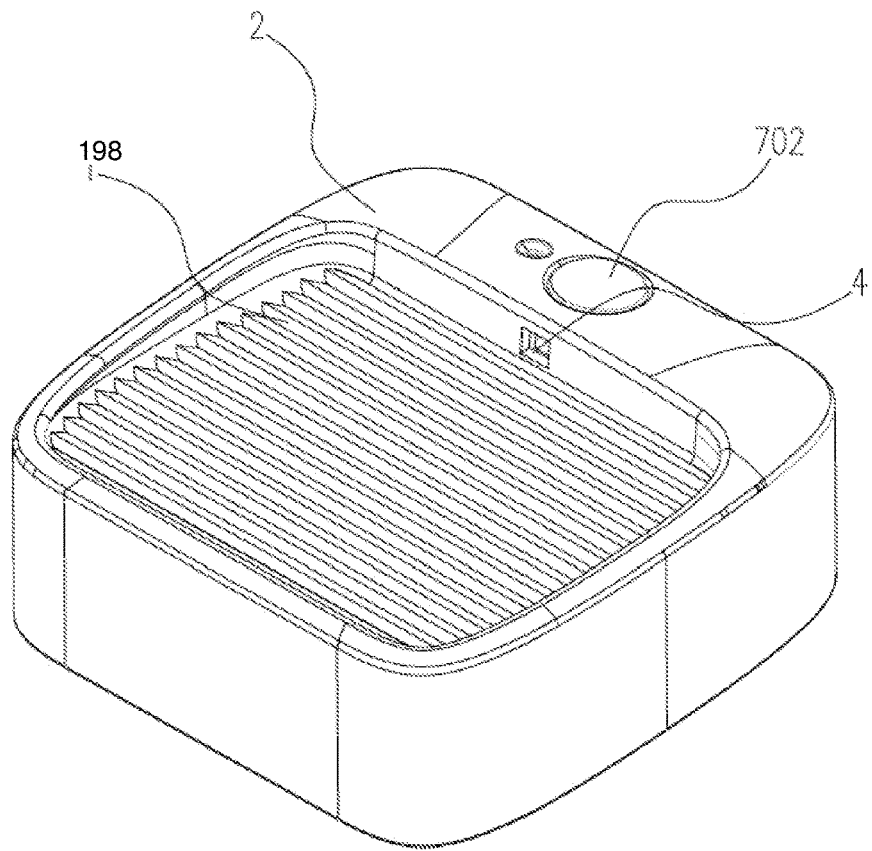
FIG. 2 shows another lighting apparatus example.

The slope surface 6602 and an inner wall 6607 form a cavity 6614 below the top surface 6601. Specifically, the top surface 6601 is a surface defined by a portion of the top cover 6603. The cavity 6614 of the slope surface 6602 and the inner wall 6607 is a concave structure extended inwardly from an inner area of the top surface 6601. Several drawings like FIG. 1 and FIG. 2 show examples of such arrangement.

The inner wall 6607 has a light opening 6608. There may be three sides of the inner wall, while the light opening 6608 is disposed at one side. In some embodiments, two sides of the inner wall have triangular shapes while the side with the light opening has a rectangular shape. This is shown in the example of FIG. 1, while three inner wall having two triangular shapes and one rectangular shape with a light opening.

The light source 6606 emits a light 6615 with a first direction 6616 via the light opening 6608 of the top cover 6603. Specifically, the light 6615 emitted by the light source 6606 follow the first direction 6616, which may refer to a set of light paths of the light emitted from the light source 6606. A portion or all the light of the light source 6606 is reflected, refracted or guided by the slope surface 6602. Some may be emitted to the inner wall 6607 mentioned above and reflected by the inner wall 6607. Therefore, it is useful for attaching a reflective layer on the inner wall 6607 to further increase light efficiency.

The light 6615 is guided by the slope surface 6602 to move with a second direction 6618 to escape from the top surface 6601 of the top cover 6603. Similar to the first direction 6616, the second direction 6618 may refer to a set of light paths, instead of referring to a single direction.

The light source 6606 includes a LED module 6605 and a driver 6619 for generating a driving current supplied to the LED module to emit the light. The LED module may include one or multiple LED chips that may even have different optical parameters to be controlled by the driver 6619 to produce mixed lights of different parameters as required.

The driver 6619 may include only electricity electrodes, wires or further include control circuits for changing output of the LED module. In some embodiments, the driver 6619 may include rectifier, current sources and other circuits as an interface to control and to provide power to the LED module.

The bottom cover 6609 is plugged to fix to the top cover 6603. For example, the top cover 6603 and the bottom cover 6609 both have lateral walls 6620, 6621 and their lateral walls 6620, 6621 have buckle structures to be plugged to be fixed together forming a rectangular box.

In some embodiments, the top cover 6603 and the bottom cover 6609 may not have lateral walls, and a middle structure, e.g. a tubular structure is used for connecting the top cover and the bottom cover, which is another type of way to fix the top cover to the bottom cover. Other variation structures may also be used.

In some embodiments, the top cover 6603 and the bottom cover 6609 are fixed together with a buckle structure, e.g. each having a buckle unit 6610, 6611 together forming a buckle structure. Specifically, one of the top cover and the bottom cover may have a protruding blocks with or without a reverse hook while the other has a groove or a hole to form a pair of buckle units as the buckle structure mentioned here.

Figure 18A:
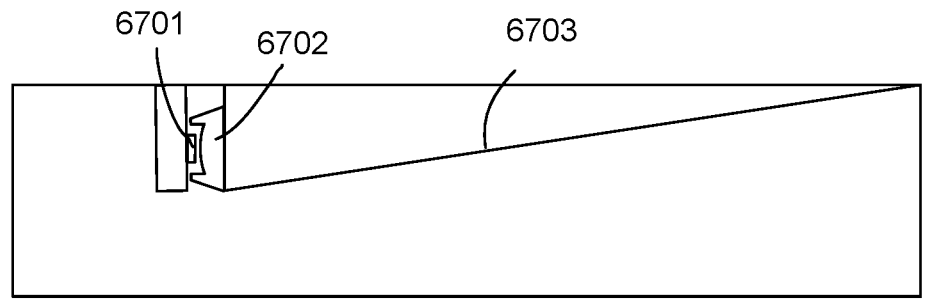
FIG. 18A shows a diffusion lens example.
Figure 18B:
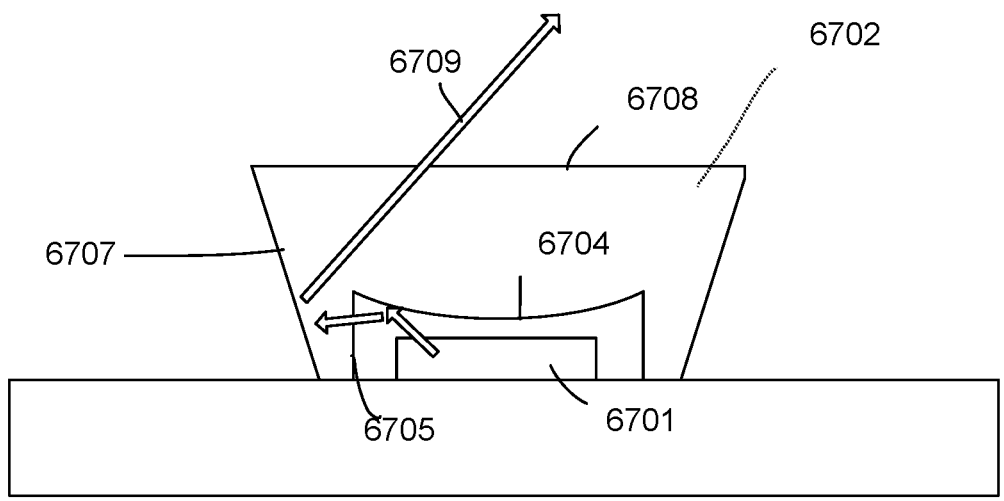
FIG. 18B shows the diffusion lens and the LED module.

In FIG. 18A and FIG. 18B, the light source 6701 has a diffusion lens 6702 for diffusing the light of the light source 6701 before being emitting to the slope surface 6703. Such diffusion lens 6702 may have an inner top reflective surface 6704 for reflecting the light 6709 of the LED module to enter a refraction lateral side 6705 and then the light is further reflected by a lateral reflection surface 6707 to an output surface 6708 of the diffusion lens 6702 to diffusing the light of the LED module.

In some embodiments, the bottom cover 6609 has a battery container 6622 for loading a battery 6612. More than one battery may be installed and corresponding structures and shapes may be prepared according to the shapes of the battery used.

The driving current is supplied by the battery. The power of the battery may be forwarded directly to the LED module by wires of the driver or further processed by the driver.

Figure 3:
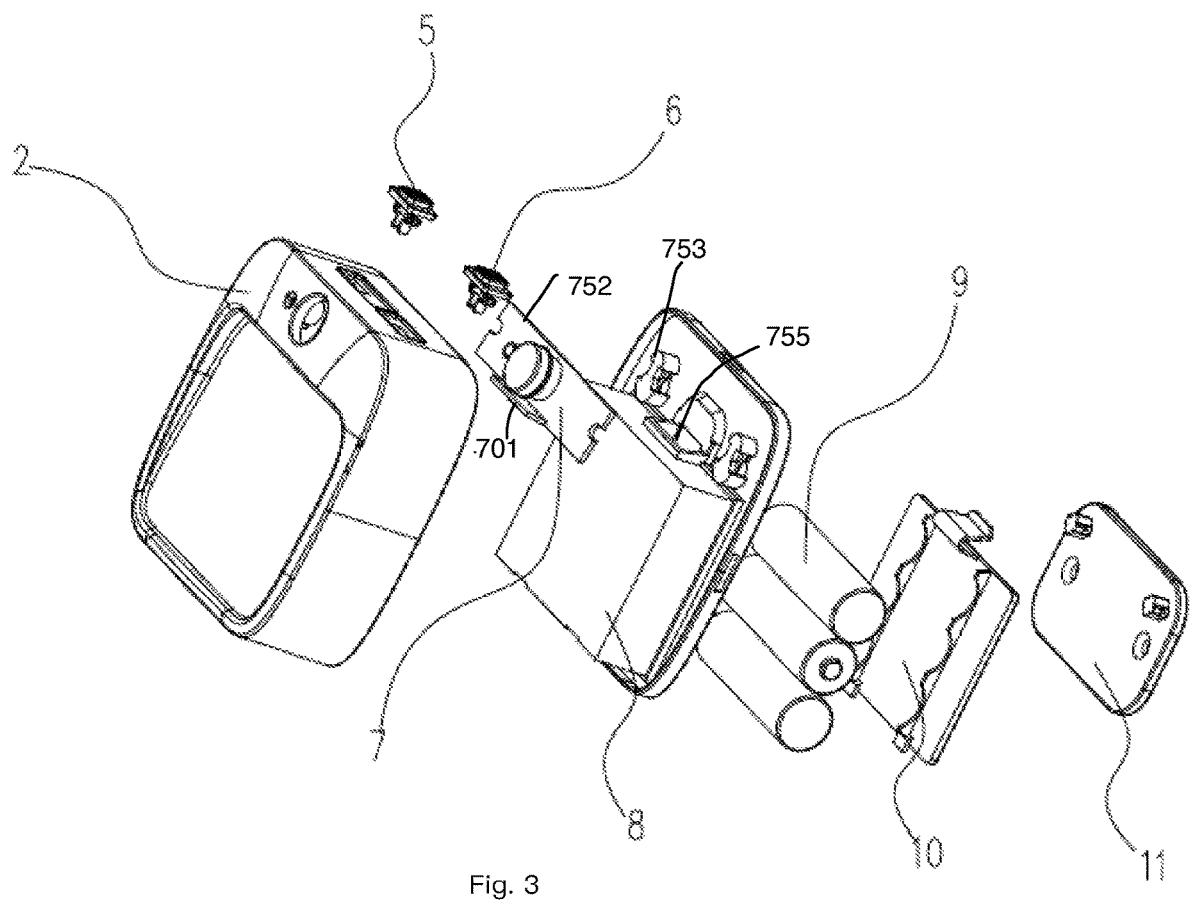
FIG. 3 shows an exploded view of the example in FIG. 1.

In some embodiments, a bottom surface of the bottom cover has a battery opening 6623 for inserting the battery 6612. A battery cover 6613 is used for sealing the battery opening 6623 after the battery 6612 is loaded. Specifically, the battery is inserted from a side opposite to the top surface of the top cover. An example is also illustrated in FIG. 3.

In some embodiments, the inner wall has an installation side disposed with the light opening. As mentioned above, the inner wall may have three sides, and the side with the light opening is the installation side.

The light opening faces to the slope surface of the top cover for reflecting light. There may be a tilt angle between the light opening and the slope surface, e.g. an angle between 20 degrees to 80 degrees to ensure lights being smoothly and evenly reflected from the slope surface.

In some embodiments, the LED module is disposed behind the light opening of the inner wall. The light of the LED module is passing through the light opening to reach the slope surface.

Figure 6:
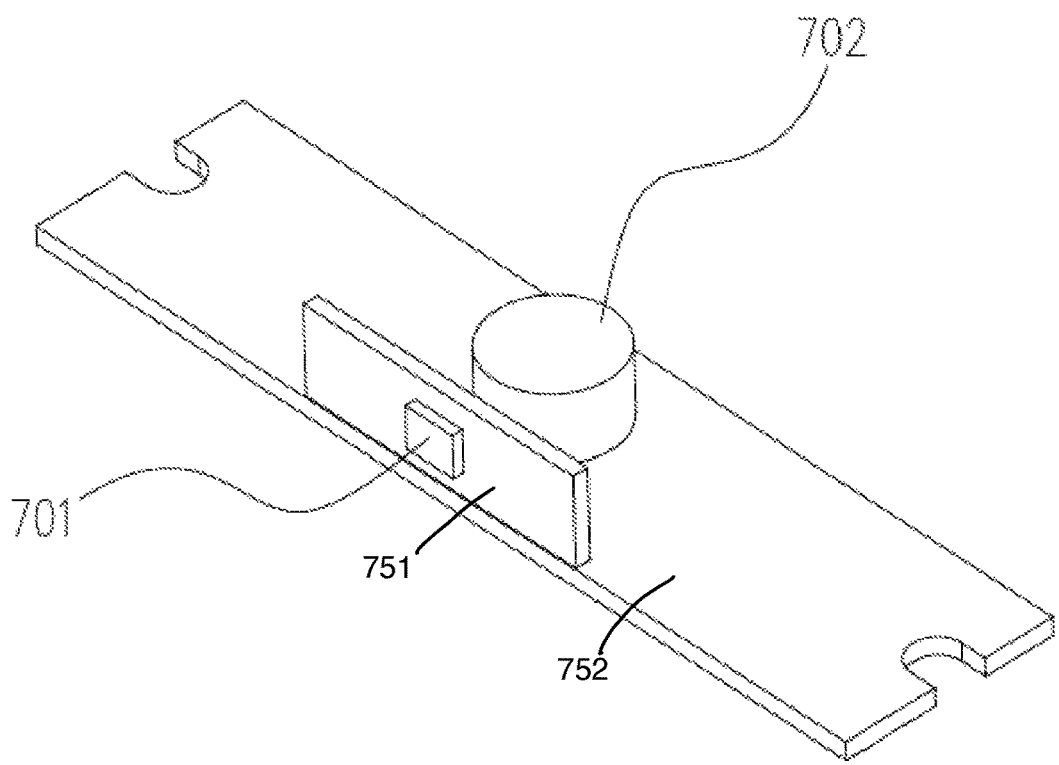
FIG. 6 shows a circuit board mounted with a LED module.

In FIG. 6, the LED module 701 is disposed on a first circuit board 751 mounted on a second circuit board 752. The first circuit board 751 is plugged or fixed to the second circuit board 752 with a vertical angle or a tilt angle so as to align the output direction of the LED module 701 with the light opening of the top cover.

In FIG. 3, the second circuit board 752 is disposed on a platform 753 of the bottom cover 8 for aligning the LED module 701 to the light opening 755 of the top cover 8. The platform 753 may have an aligning and plugging structure to install the second circuit board 752 on the platform 753. When the bottom cover 8 is fixed to the top cover 2, the LED module 701 is aligned with the light opening 755.

In FIG. 13, a reflective layer 6641 is disposed on the slope surface 6602. For example, an additional plate is placed on the slope surface 6602.

In some embodiments, the reflective layer is detachable attached to the slope surface to be manually replaced with another reflective layer. In other words, different colors or materials of the reflective layer may be replaced by a user when needed.

For example, FIG. 1 and FIG. 2 show two different reflective layers are respectively attached on the slope surface.

In some embodiments, the reflective layer has multiple wave structures, e.g. the one shown in FIG. 2, which soften and guides light to form a desired pattern.

Figure 17:
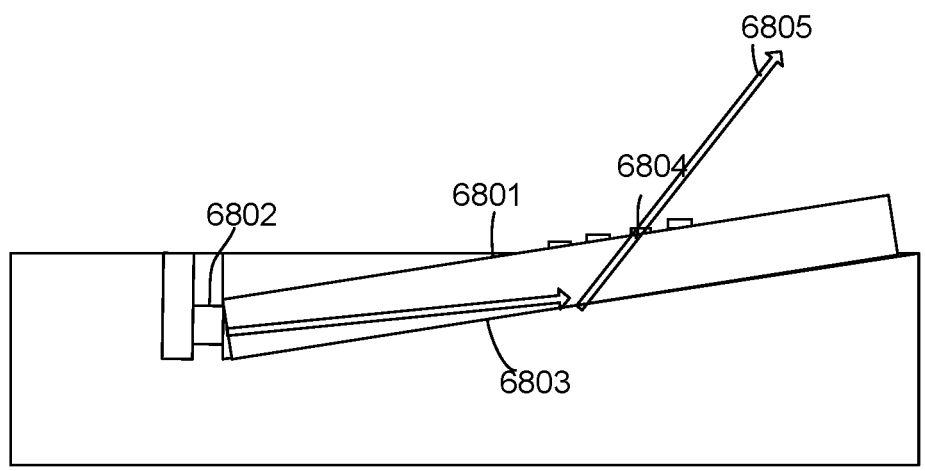
FIG. 17 shows a light guide plate example.

In FIG. 17, a light guide plate 6801 is placed on the slope surface 6803. The light guide plate 6801 is a transparent plastic plate with a main surface disposed with lots of micro dots 6804 for lights 6805 to escape from the micro dots 6804 that may be made by laser devices. The light is received from a lateral side of the light guide plate and then guided to move inside the plate before finally escaping from the micro dots of the main surface.

The LED module emits the light into a lateral side of the lateral guide plate for the light to escape from a main surface of the light guide plate.

Figure 19:
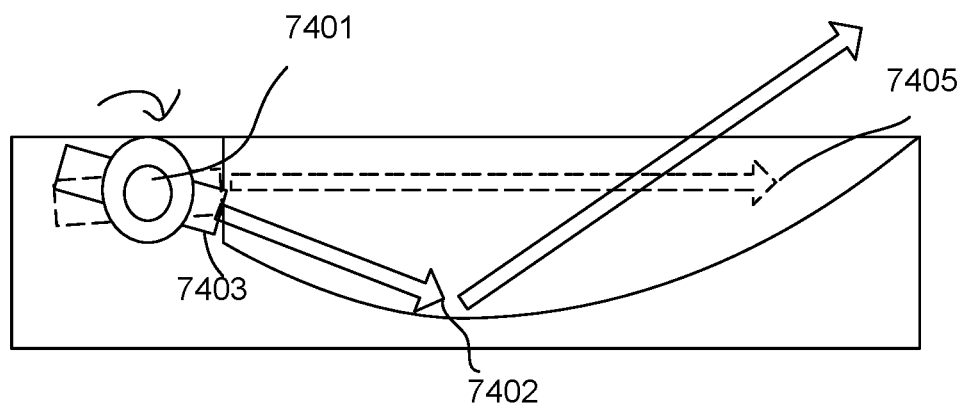
FIG. 19 shows a rotation structure for changing light direction of the LED module.

In FIG. 19, the LED module is connected to a rotatable structure 7401 so as to adjust the first direction 7402 of the LED module 7403 to the slope surface. In other words, the LED module is rotated with respect to the slope surface to change a light effect on the slope surface. For example, the dotted line shows the LED module 7403 is rotated to emit light to another direction 7405.

In some embodiments, the bottom cover 7603 has an electrical plug 7601 to be plugged to an external electrical socket 7602 to receive a power supply to the driver. For example, the electrical socket 7602 is a standard electrical socket mounted on a wall. Users plug the lighting apparatus with the electrical plug 7601 with two or three pins to the electrical socket to receive an indoor power of 110V/220V alternating power source. The input power is converted by the driver mentioned above to generate a driving current supplied to the LED module.

In FIG. 13, the lighting apparatus may also include a manual switch 6651 disposed on a surface of the top cover 6603. Such manual switch 6651 may indicate a color temperature, a color or other parameters to the driver to control multiple types of LED chips of the LED modules to emit mixed lights of required parameters.

The manual switch is operated to instruct the driver to change a setting to the LED module.

In FIG. 13, the lighting apparatus may also include a sensor 6604 coupled to the driver for detecting an external event to change a setting of the driver 6610 to control the LED module 6605.

In some embodiments, the sensor includes a light sensor 6653 to detect an ambient light level for the driver to automatically determine whether to turn on or turn off the LED module according to the ambient light level.

In some embodiments, the sensor includes a motion sensor 6654 to detect a movement of an object for the driver to determine whether to turn on or turn off the LED module.

Figure 15:
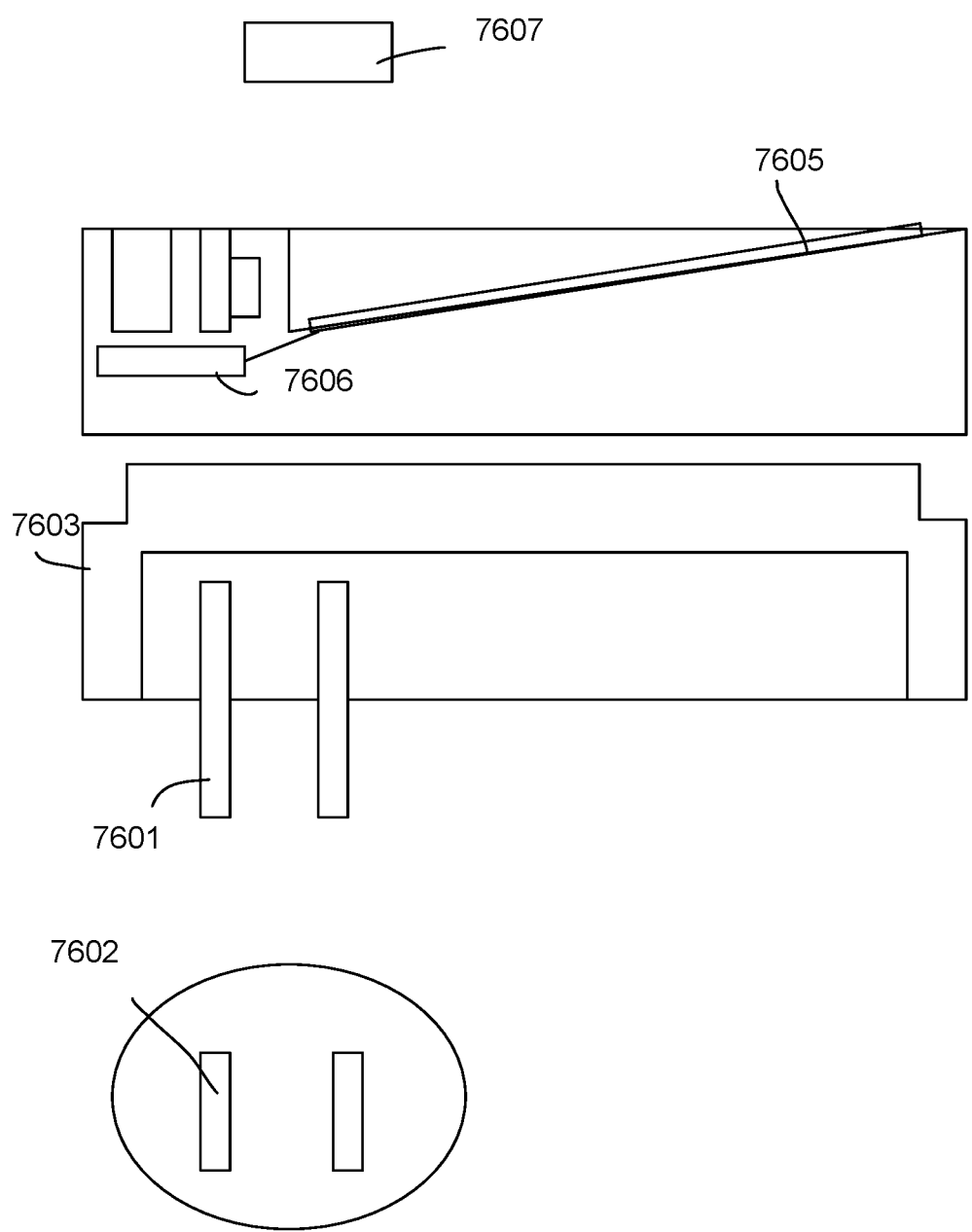
FIG. 15 shows another back cover example.

In FIG. 15, the slope surface is attached with a touch input device 7605 coupled to the driver 7606 to control the LED module. Such touch input device 7605 may be a resistor touch interface, a capacitor touch interface, a touch and pressing button or other input structures for receiving an operation of a user.

In some embodiments, the slope surface is attached with touch input device coupled to the driver to wirelessly control another light device 7607. For example, the driver includes a wireless circuit to control one or multiple devices like light devices. In other words, by pressing or applying a gesture on the slope surface, another lighting device may be controlled conveniently.

Figure 16:
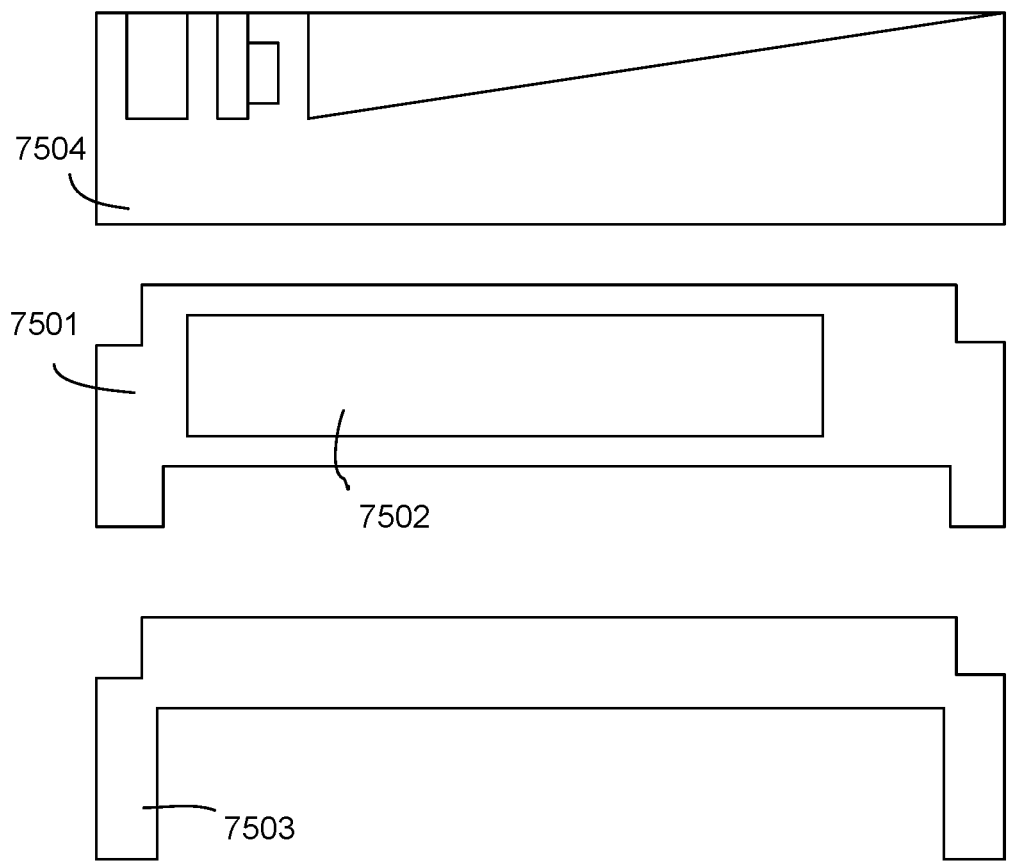
FIG. 16 shows a stack function module example.

In FIG. 16, multiple function modules 7501 re detachably stacked to the top cover 7054 to add functions of the multiple function modules. For example, a speaker, a wireless communication module, a wireless charging module, a microphone, a sensor or other function modules may be plugged or inserted to enhance the overall function of the lighting apparatus. Such function modules may share the power of the driver or the battery. Some function modules may even be used for providing power, e.g. a battery module.

In FIG. 16, one or multiple function modules 7501 with function circuits 7502 as mentioned above is stacked between the top cover 7504 and the bottom cover 7503. In short, if the function module is not used, the top cover 7504 and the bottom cover 7503 function as the same as mentioned. But when function modules are added, more functions may be provided with the same device, e.g. sharing the battery or the electrical plugs mentioned above.

Figure 14A:
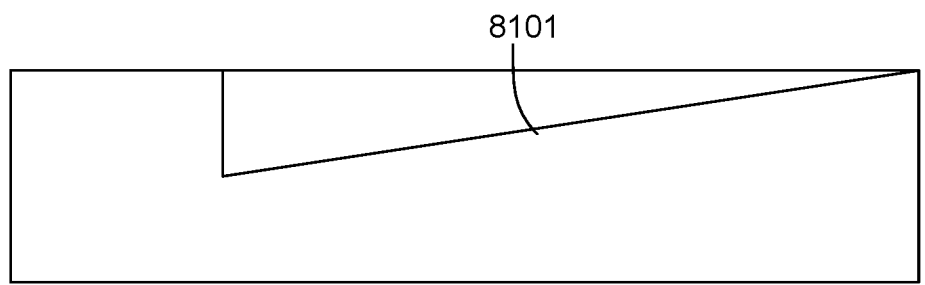
FIG. 14A shows a slope surface example.
Figure 14B:
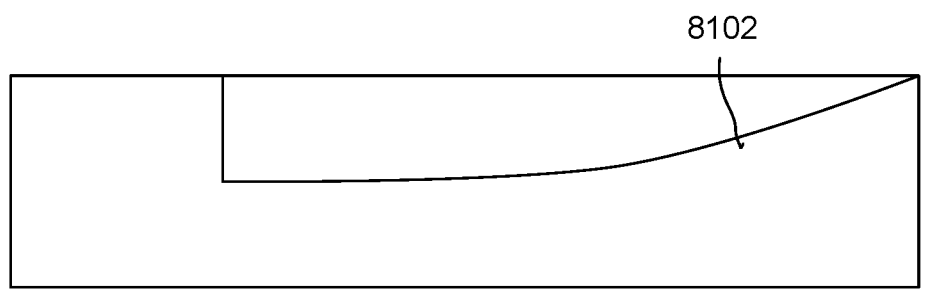
FIG. 14B shows another slope surface example.

FIG. 14A shows a slope surface 8101 with a flatten surface. FIG. 14B shows a slope surface 8102 with curve surface. Both are also covered by the term slope surface mentioned in this closure. Other variations may be made depending on different angles and light output are required.

Please refer to FIG. 1, which illustrates an embodiment of a lighting apparatus. The lighting apparatus has an infrared sensor 702 as the sensor mentioned above. There is a light opening 4 allowing a light of a LED module to pass through emitting on a slope surface 1 of a top cover 2. The slope surface 1 has a reflective layer for reflecting the light.

FIG. 2 shows another embodiment with a wave shaped structure slope surface 198 to provide a different output style.

FIG. 3 shows an exploded view of the example in FIG. 1.

The top cover 2 is fixed to a bottom cover 8. There is a second circuit board 752 mounted with a LED module 701 as a light source 7 that is further mounted on a platform 753 so as to align the LED module to the light opening 755. There are two manual switches 5, 6 for adjusting parameters of the lighting apparatus.

The battery 9 is placed on a battery holder 10 that also seals the battery container of the bottom cover 8. There is an additional fixing unit 11 for fixing the lighting apparatus to a desired place, e.g. a wall with a hook.

Figure 4:
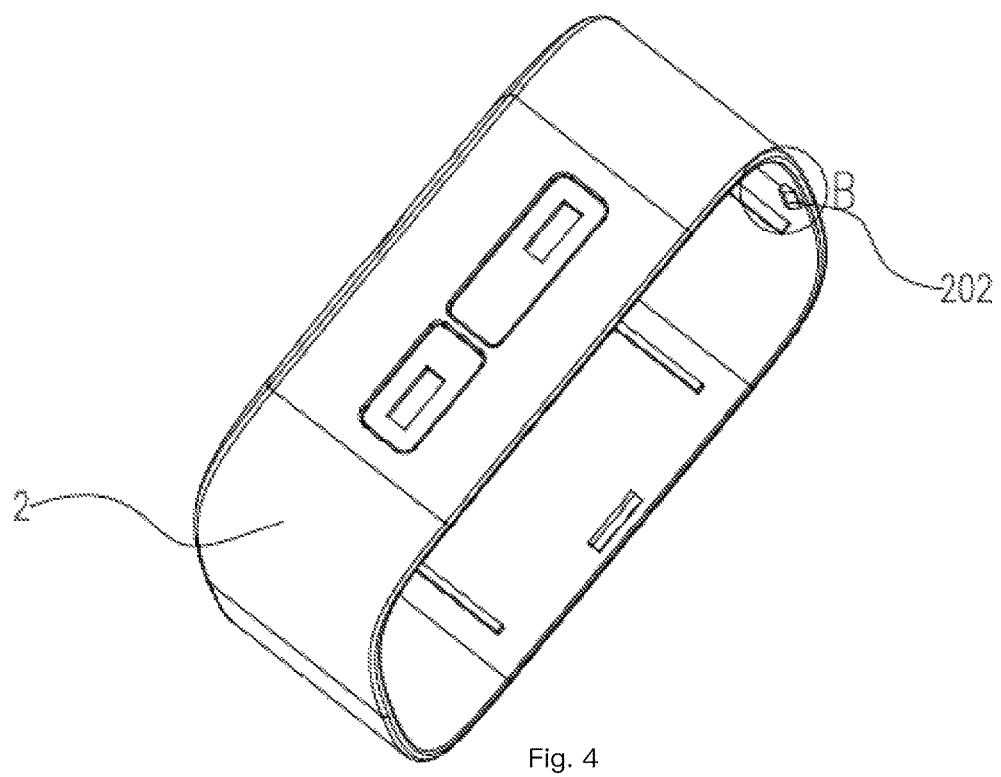
FIG. 4 shows a component in the example of FIG. 1.

FIG. 4 shows the top cover with a buckle unit 202 to be buckled to the bottom cover.

Figure 5:
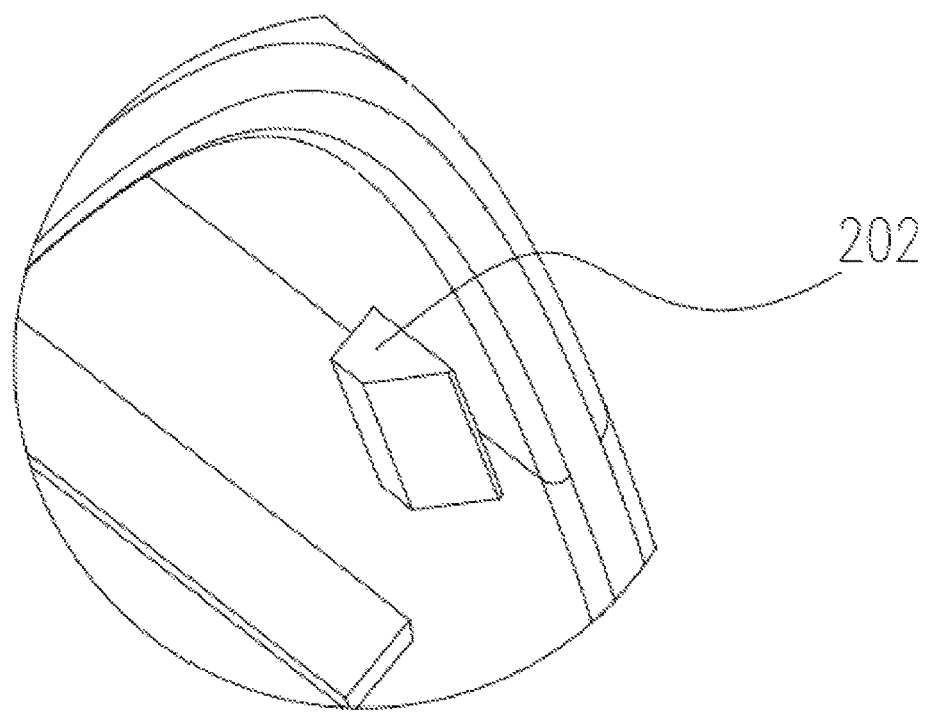
FIG. 5 is a zoom-up view of a component of FIG. 4.

FIG. 5 shows a zoom-up view of the buckle unit 202, which appears as a protruding block to be inserted to a corresponding groove.

Figure 7:
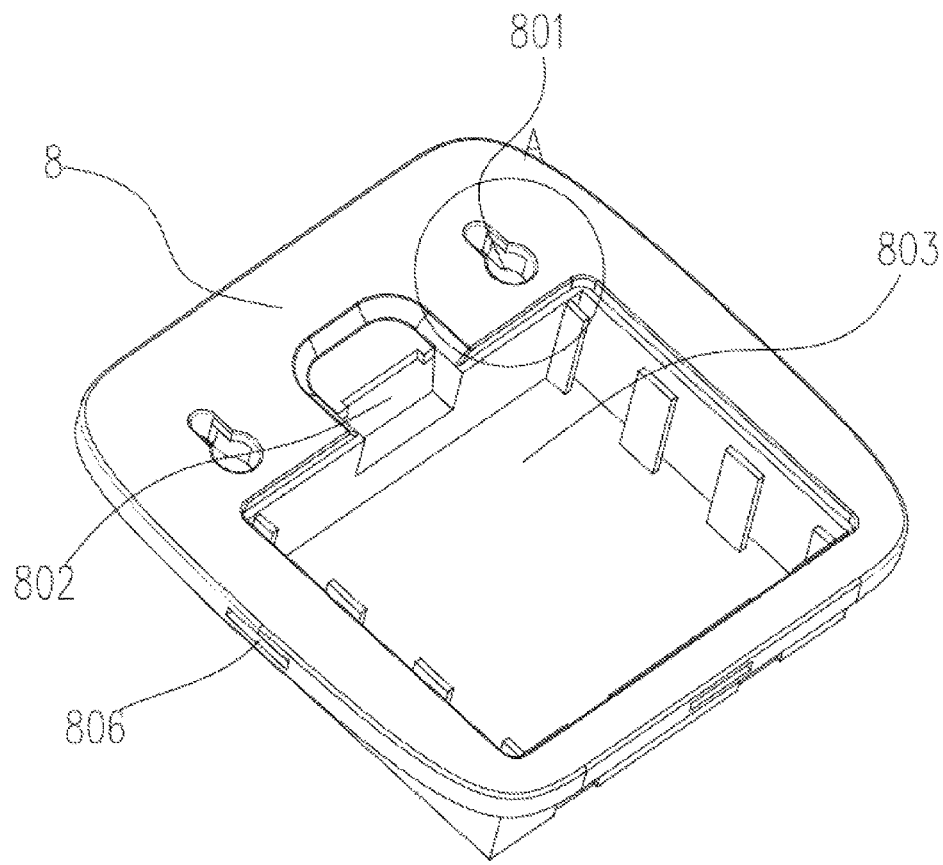
FIG. 7 shows a battery holder.

FIG. 7 shows a battery container 803 in a bottom cover 8. There is a keyhole 801 for fixing the lighting apparatus to a platform. An escape groove 802 is used for clipping to a battery cover. There is a buckle unit 806 to fix to a corresponding buckle unit on a top cover.

Figure 8:
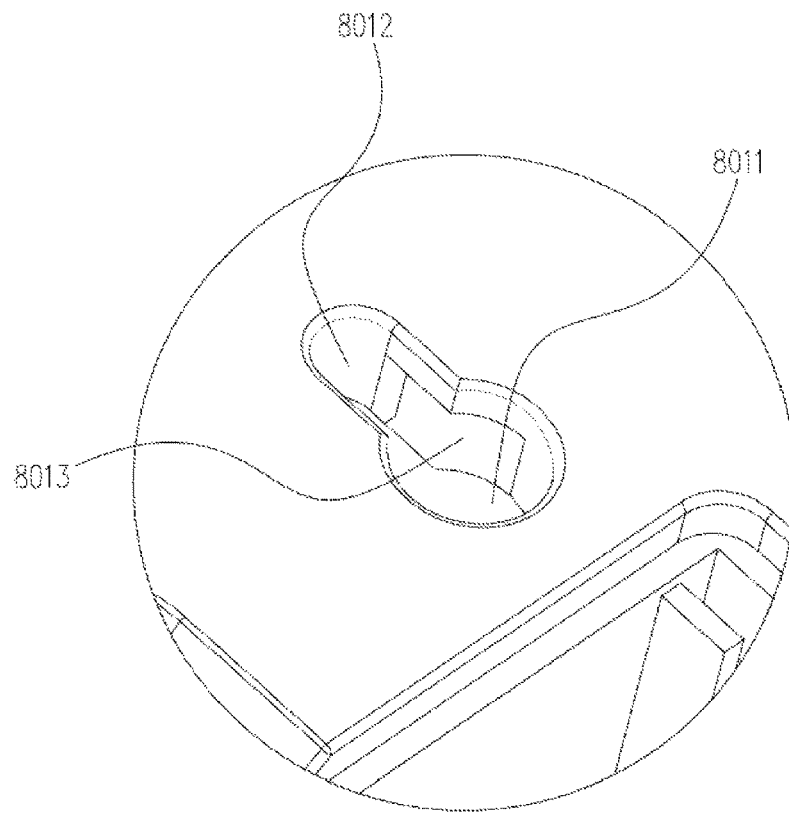
FIG. 8 shows a keyhole structure.

FIG. 8 shows a zoom-up view of a keyhole with an enlarging circle 8013 for inserting a pin and the pin is pressed along the track 8013 to a second position 8012 with a narrow diameter to stay in the second position 8012.

Figure 9:
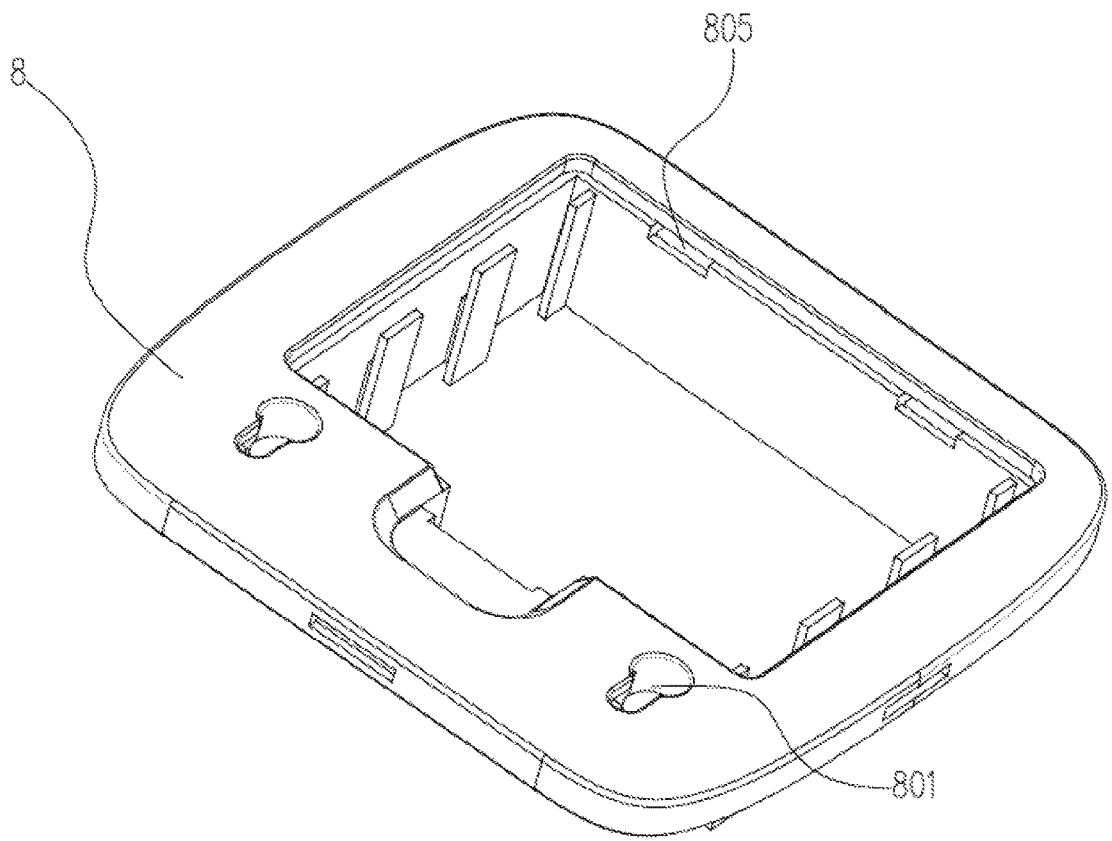
FIG. 9 shows another view of the battery holder.

FIG. 9 shows another view of the bottom cover 8 that has a keyhole 801 and a protruding block 805 for fixing to a battery cover.

Figure 10:
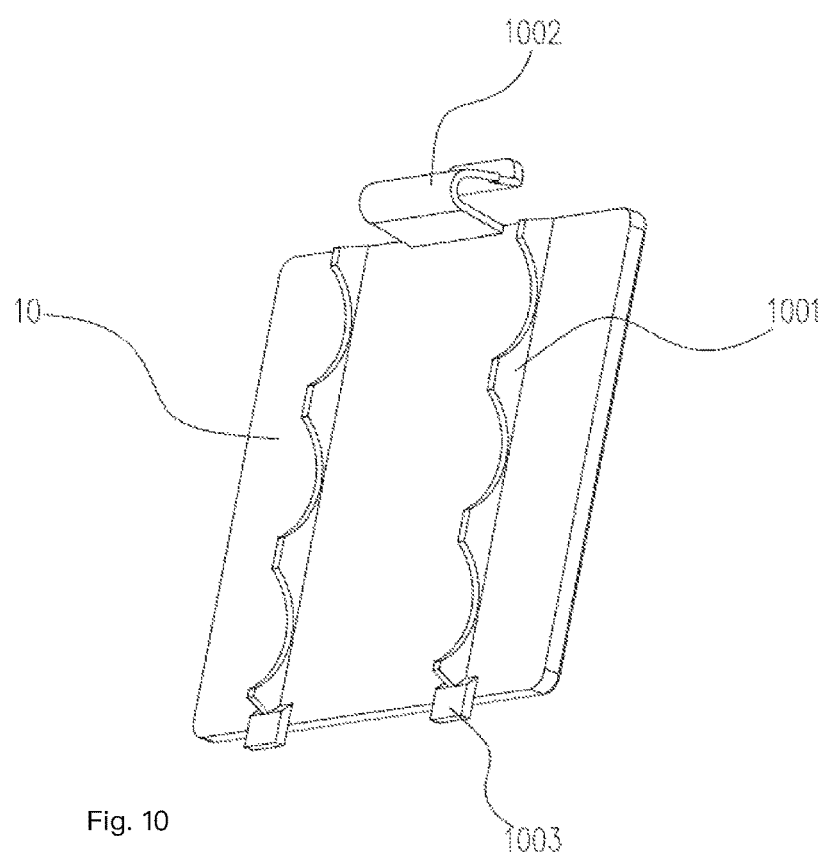
FIG. 10 shows a battery cover.

FIG. 10 shows a battery cover 10 that has elastic hook 1002 with electrodes 1003 and battery groove 1001 for aligning the battery.

Figure 11:
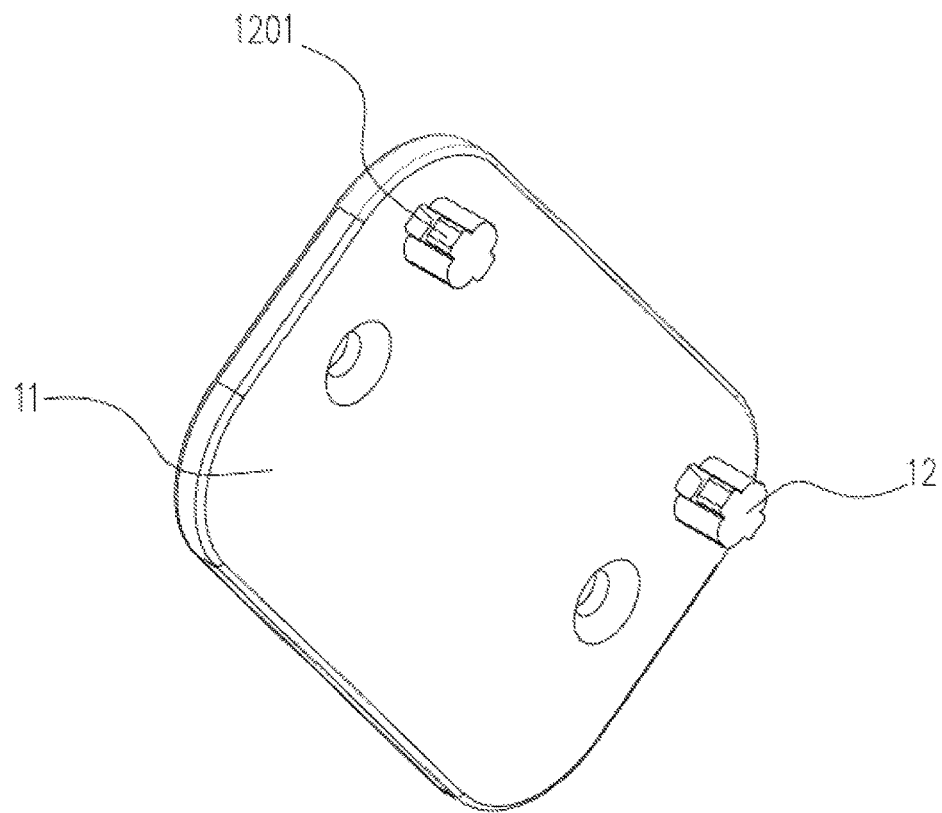
FIG. 11 shows a fixing unit.

FIG. 11 shows the fixing unit 11 having two protruding columns 12, 1201 to be fixed to a platform.

Figure 12:
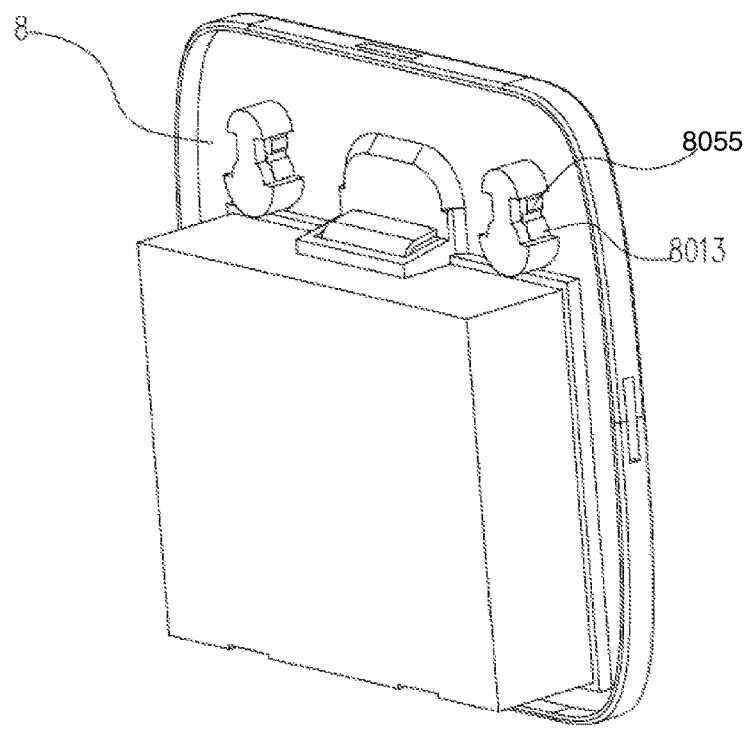
FIG. 12 shows another view of the bottom cover.

FIG. 12 shows the bottom cover having lock and aligning structures 8055, 8013 for placing the circuit board.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings.

The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

The invention claimed is:

1. A lighting apparatus, comprising:
a top cover having a top surface, a slope surface and an inner wall, wherein the slope surface and an inner wall form a cavity below the top surface, the inner wall has a light opening;
a light source for emitting a light with a first direction via the light opening of the top cover, wherein the light is guided by the slope surface to move with a second direction to escape from the top surface of the top cover, wherein the light source comprises a LED module and a driver for generating a driving current supplied to the LED module to emit the light;
a bottom cover to be plugged to fix to the top cover; and
a sensor coupled to the driver for detecting an external event to change a setting of the driver to control the LED module, wherein the sensor comprises a motion sensor to detect a movement of an object for the driver to determine whether to turn on or turn off the LED module.

2. The lighting apparatus of claim 1, wherein the top cover and the bottom cover are fixed together with a buckle structure.

3. The lighting apparatus of claim 1, wherein the light source has a diffusion lens for diffusing the light of the LED module before being emitting to the slope surface.

4. The lighting apparatus of claim 1, wherein the bottom cover has a battery container for loading a battery, the driving current is supplied by the battery.

5. The lighting apparatus of claim 4, wherein a bottom surface of the bottom cover has a battery opening for inserting the battery.

6. The lighting apparatus of claim 1, wherein the inner wall has an installation side disposed with the light opening, the light opening faces to the slope surface of the top cover for reflecting light, the LED module is disposed behind the light opening of the inner wall.

7. The lighting apparatus of claim 6, wherein the LED module is disposed on a first circuit board mounted on a second circuit board, the second circuit board is disposed on a platform of bottom cover for aligning the LED module to the light opening of the top cover.

8. The lighting apparatus of claim 6, wherein a reflective layer is disposed on the slope surface.

9. The lighting apparatus of claim 8, wherein the reflective layer is detachable attached to the slope surface to be manually replaced with another reflective layer.

10. The lighting apparatus of claim 8, wherein the reflective layer has multiple wave structures.

11. The lighting apparatus of claim 6, wherein a light guide plate is placed on the slope surface, the LED module emits the light into a lateral side of the lateral guide plate for the light to escape from a main surface of the light guide plate.

12. The lighting apparatus of claim 1, wherein the LED module is connected to a rotatable structure so as to adjust the first direction of the LED module to the slope surface.

13. The lighting apparatus of claim 1, wherein the bottom cover has an electrical plug to be plugged to an external electrical socket to receive a power supply to the driver.

14. The lighting apparatus of claim 1, further comprising a manual switch disposed on a surface of the top cover, wherein the manual switch is operated to instruct the driver to change a setting to the LED module.

15. The lighting apparatus of claim 1, wherein the sensor comprises a light sensor to detect an ambient light level for the driver to automatically determine whether to turn on or turn off the LED module according to the ambient light level.

16. The lighting apparatus of claim 1, wherein the slope surface is attached with a touch input device coupled to the driver to control the LED module.

17. The lighting apparatus of claim 1, wherein the slope surface is attached with touch input device coupled to the driver to wirelessly control another light device.

18. The lighting apparatus of claim 1, wherein multiple function modules are detachably stacked to the top cover to add functions of the multiple function modules.

* * * * *